United States Patent [19]
Ott et al.

[11] Patent Number: 5,460,008
[45] Date of Patent: Oct. 24, 1995

[54] METHOD OF REFRIGERATION CASE SYNCHRONIZATION FOR COMPRESSOR OPTIMIZATION

[75] Inventors: James H. Ott, Akron; James P. Henderson, Tallmadge; Mark E. Anglin, Wadsworth, all of Ohio

[73] Assignee: Novar Electronics Corporation, Barberton, Ohio

[21] Appl. No.: 173,614

[22] Filed: Dec. 22, 1993

[51] Int. Cl.⁶ .................................................... F25B 7/00
[52] U.S. Cl. ............................. 62/175; 62/203; 62/228.3
[58] Field of Search .................................. 62/175, 228.3, 62/203; 236/1 EA

[56] References Cited

U.S. PATENT DOCUMENTS

| | | | |
|---|---|---|---|
| 4,183,223 | 1/1980 | Alsenz | 62/80 |
| 4,531,376 | 7/1985 | Alsenz | 62/156 |
| 4,535,602 | 8/1985 | Alsenz et al. | 62/175 |
| 4,537,038 | 8/1985 | Alsenz et al. | 417/12 X |
| 4,578,959 | 4/1986 | Alsenz | 340/583 X |
| 4,593,533 | 6/1986 | Alsenz | 62/151 X |
| 4,612,776 | 9/1986 | Alsenz | 62/228.3 |
| 4,628,700 | 12/1986 | Alsenz | 62/510 X |
| 4,633,672 | 1/1987 | Persem et al. | 62/228.3 X |
| 4,651,535 | 3/1987 | Alsenz | 62/225 |
| 4,679,404 | 7/1987 | Alsenz | 62/175 |
| 4,686,835 | 8/1987 | Alsenz | 62/223 |
| 4,697,431 | 10/1987 | Alsenz | 62/225 |
| 4,735,060 | 4/1988 | Alsenz | 62/212 X |
| 4,825,662 | 5/1989 | Alsenz | 62/175 X |
| 4,831,832 | 5/1989 | Alsenz | 62/117 |
| 4,951,475 | 8/1990 | Alsenz | 62/117 |
| 5,050,397 | 9/1991 | Sugiyama et al. | 62/175 |

*Primary Examiner*—William E. Wayner
*Attorney, Agent, or Firm*—Bliss McGlynn

[57] ABSTRACT

A method of controlling a plurality of commonly piped compressors for a refrigeration system having a plurality of refrigeration cases including the steps of sensing a suction pressure of the refrigeration system, determining whether the sensed suction pressure is within a predetermined pressure range, and turning compressors ON or OFF in stages until the suction pressure is within the predetermined pressure range. The method also includes the steps of sensing a case temperature for each of the refrigeration cases if the sensed suction pressure is within the predetermined pressure range and determining whether the sensed case temperature is within a predetermined temperature range. The method further includes the steps of turning selectively the load of the refrigeration cases ON and OFF until the case temperature is within the predetermined temperature range if the sensed case temperature is not within the predetermined temperature range and ending the method if the sensed case temperature is within the predetermined temperature range.

30 Claims, 7 Drawing Sheets

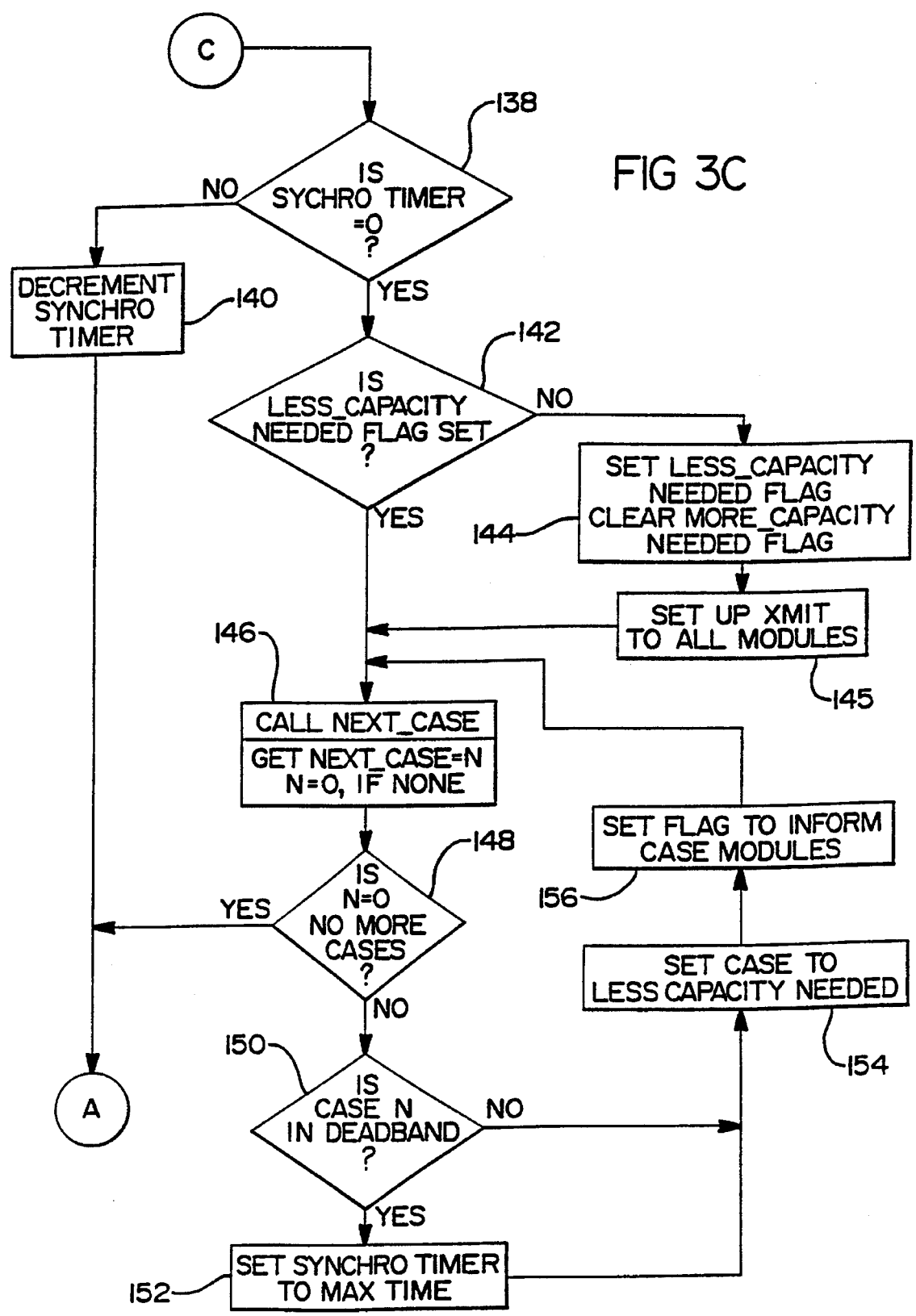

METHOD OF REFRIGERATION CASE SYNCHRONIZATION FOR COMPRESSOR OPTIMIZATION

BACKGROUND OF THE INVENTION

1. Field of the Invention

The present invention relates generally to refrigeration systems and, more specifically, to a method of refrigeration case synchronization for compressor optimization.

2. Description of the Related Art

A conventional refrigeration system includes a compressor for compressing refrigerant vapor and discharging it into a condenser. The condenser liquifies the refrigerant which flows into a receiver. From the receiver, the liquid refrigerant flows through a heat exchanger and through a thermostatic expansion valve. The expansion valve expands the liquid refrigerant into a vapor which flows into and through an evaporator. Passing through the evaporator, the expanded refrigerant absorbs heat from a refrigeration case, aided by a circulating fan, and then returns to the compressor.

Typically, the refrigeration system includes a plurality of refrigeration cases and compressors. The compressors are commonly piped together to form a compressor rack and pressure detection sensors are used for establishing and detecting a compressor suction pressure range in the refrigeration system for determining when upper (cut-in) and lower (cut-out) limits of the compressor suction pressure range have been exceeded. The refrigeration system uses a logic circuit for turning or cycling the compressors ON and OFF in succession or stages when the limits are exceeded to bring the compressor suction pressure within the compressor suction pressure range.

One disadvantage of the above refrigeration system is that the cut-in and cut-out limits provide only a coarse control of the compressor rack in the compressor suction pressure range. As a result, the compressors of the compressor rack may be cycled frequently, resulting in a shorter life for the compressors. Another disadvantage is that the cycling of the compressors may cause the compressor suction pressure to rise or fall too quickly, resulting in excessive condenser cycling. Therefore, there is a need in the art to control each refrigeration case load to regulate the compressor rack only when the refrigeration cases cannot maintain control. There is also a need in the art to reduce the cycling of rotating machinery (e.g., compressors and condenser fans) by increasing the work done by non-rotating machinery (e.g., case expansion valves).

SUMMARY OF THE INVENTION

It is, therefore, one object of the present invention to provide a method of refrigeration case synchronization for compressor optimization.

It is another object of the present invention to reduce cycling of rotating machinery such as compressors and condenser fans in a refrigeration system.

It is yet another object of the present invention to provide a method of controlling each refrigeration case load to regulate a compressor rack only when the compressors cannot maintain control.

It is still another object of the present invention to increase the amount of time between switching ON or OFF the next stage of a compressor rack.

To achieve the foregoing objects, the present invention is a method of controlling a plurality of commonly piped compressors for a refrigeration system having a plurality of refrigeration cases. The method includes the steps of sensing a suction pressure of the refrigeration system, determining whether the sensed suction pressure is within a predetermined range, and turning compressors ON or OFF in stages until the suction pressure is within the predetermined pressure range. The method also includes the steps of sensing a case temperature for each of the refrigeration cases if the sensed suction pressure is within the predetermined pressure range and determining whether the sensed case temperature is within a predetermined temperature range. The method further includes the steps of turning selectively the load of the refrigeration cases ON and OFF until the case temperature is within the predetermined temperature range if the sensed case temperature is not within the predetermined temperature range and ending the method if the sensed case temperature is within the predetermined temperature range.

One advantage of the present invention is that a method is provided for refrigeration case synchronization for compressor optimization in a refrigeration system. Another advantage of the present invention is that the cycling of rotating machinery such as compressors and condenser fans is reduced by increasing the work done by non-rotating machinery such as refrigeration case expansion valves, thereby modifying the control of the load that the compressors are supplying. Yet another advantage of the present invention is that a method is provided for controlling each case load to regulate the compressor rack only when the compressors cannot maintain control. Still another advantage of the present invention is that the amount of time may be increased between switching ON and OFF the next stage of the compressor rack by using the deadband area of control within each refrigeration case load to regulate only when the compressors cannot maintain control. A further advantage of the present invention is that the synchronization method uses a proportion of those refrigeration case deadbands to define its input variables as to when it should inhibit cooling of refrigeration cases or accelerate cooling in those refrigeration cases to moderate the changes it would cause the compressors to stage up or down.

Other objects, features and advantages of the present invention will be readily appreciated as the same becomes better understood after reading the subsequent description taken in conjunction with the accompanying drawings.

BRIEF DESCRIPTION OF THE DRAWINGS

FIGS. 3A through 3E are flowcharts of a method of controlling the refrigeration case system of FIG. 1 according to the present invention.

DESCRIPTION OF THE PREFERRED EMBODIMENT(S)

Figure 1:
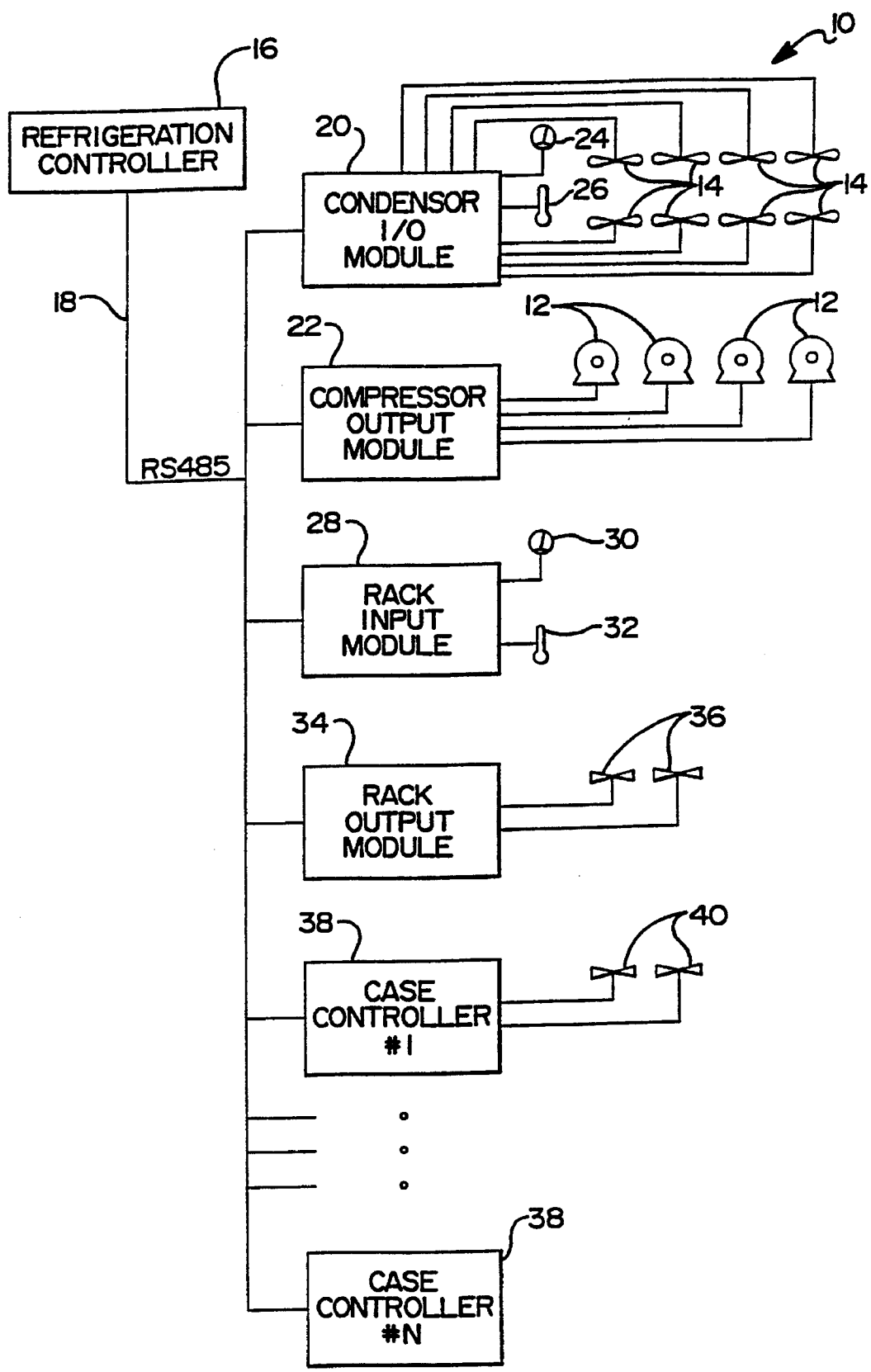
FIG. 1 is a block diagram of a refrigeration system.

Referring to FIG. 1, a refrigeration system 10 is shown. The refrigeration system 10 includes a plurality of refrigeration cases (not shown) whose capacity or load is controlled by a rack of compressors 12 which are parallel-staged and commonly piped to produce a common compressor suction pressure and temperature. The refrigeration system 10 also includes a plurality of condenser fans 14 for condensers (not shown) of the refrigeration system. The refrigeration system 10 includes a refrigeration controller 16, a communications bus (RS-485) 18 connected to the refrigeration controller 16, a condenser input/output (I/O) module 20 interconnecting the communications bus 18 and condenser fans 14, and a compressor output module 22 interconnecting the communications bus 18 and the rack of compressors 12. The refrigeration system 10 also includes a pressure sensor 24 and temperature sensor 26 attached to the condensers of the refrigeration system and connected to the condenser I/O module 20 for sensing or measuring the pressure and temperature, respectively, of the refrigerant in the condensers of the refrigeration system. It should be appreciated that the refrigeration controller 16, communications bus 18, condenser I/O module 20 and compressor output module 22 are conventional and known in the art.

The refrigeration system 10 further includes a rack input module 28 connected to the communications bus 18 and a pressure sensor 30 and a temperature sensor 32 attached to the compressor suction line (not shown) and connected to the rack input module 28 for sensing or measuring the pressure and temperature, respectively, for the rack of compressors 12. The refrigeration system 10 includes a rack output module 34 connected to the communications bus 18 and a plurality of shut-off valves and defrost coils 36 for the refrigeration cases connected to the rack output module 34. The refrigeration system 10 also includes a plurality of case controllers 38 connected to the communications bus 18 and a plurality of expansion valves 40 for the refrigeration cases connected to the case controllers 38. It should be appreciated that each refrigeration case has an evaporator, shut-off valve, defrost coil, expansion valve, etc. as is known in the art.

Figure 2:
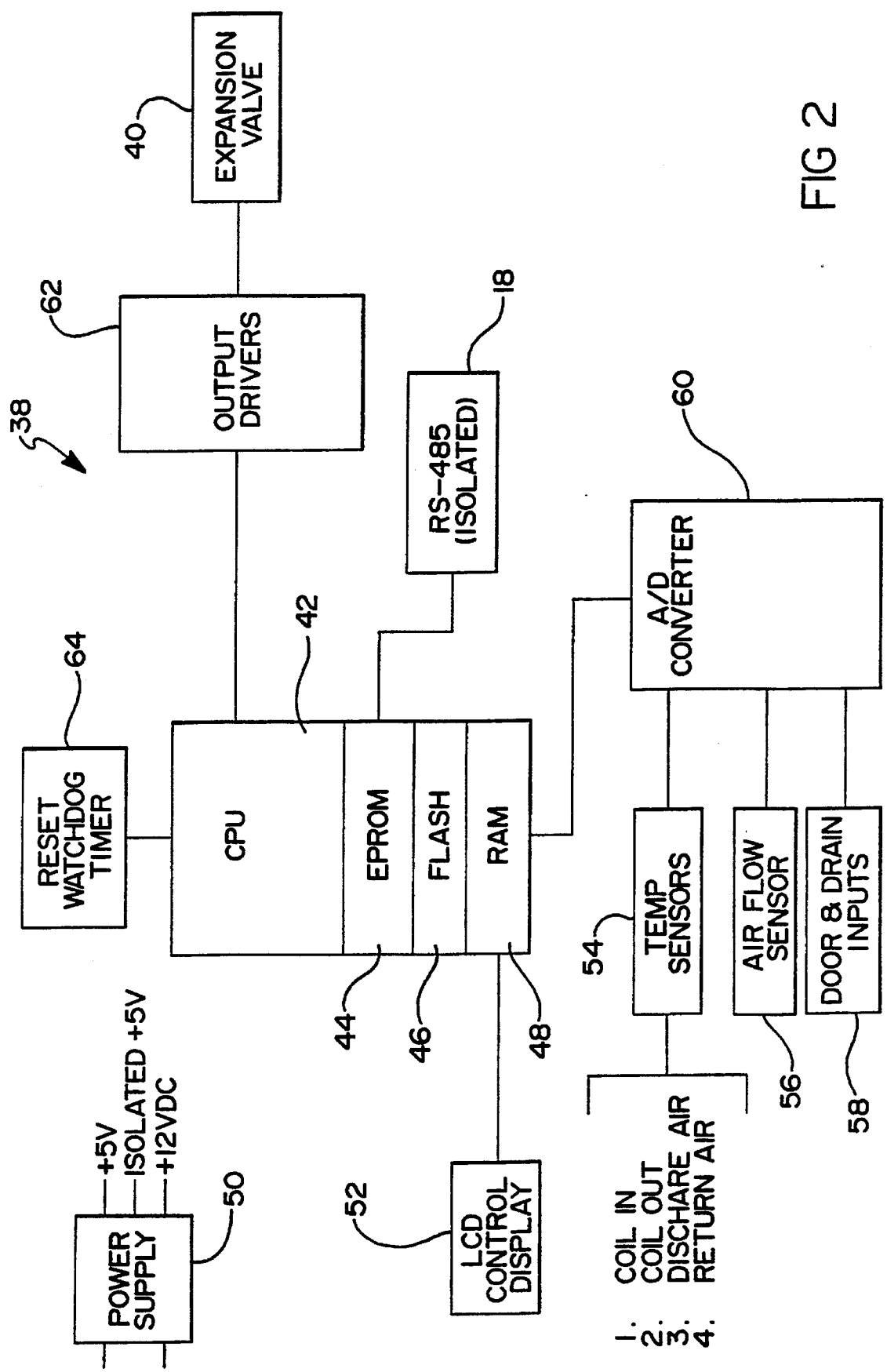
FIG. 2 is a block diagram of a case controller of FIG. 1.

Referring to FIG. 2, each case controller 38 includes a central processing unit (CPU) 42 and memory such as electronically programmable read only memory (EPROM) 44, flash memory 46 and random access memory 48. The case controller 38 also includes a power supply 50 which is connected to a source of power (not shown) and provides a plurality of voltage outputs to the case controller 38. The case controller 38 further includes a liquid crystal display (LCD) 52 for visually indicating output from the case controller 38 to an operator.

Each case controller 38 also includes a plurality of sensors for inputting data or information into the case controller 38. Specifically, the case controller 38 includes temperature sensors 54 for sensing the temperature of the refrigerant for the evaporator coil in, evaporator coil out, discharge air and return air of each refrigeration case. The case controller 38 also includes an air flow sensor 56 for measuring the air flow of the discharge and return air of each refrigeration case. The case controller 38 further includes door and drain sensors 58 for sensing whether the case door is open and whether fluid is draining from the refrigeration case. The case controller 38 also includes an analog to digital (A/D) converter 60 interconnecting the sensors 54, 56, 58 and the case controller 38. The case controller 38 further includes output drivers 62 connected to the CPU 42 and the expansion valves 40. It should be appreciated that each case controller 38 controls the opening and closing of one expansion valve 40.

The case controller 38 is connected to the communications bus 18 and has a reset watchdog timer 64 connected to the CPU 42 for resetting the CPU 42. It should be appreciated that the components of the case controller 38 are conventional and known in the art.

Referring to FIGS. 3A through 3E, a method of refrigeration case synchronization for compressor optimization, according to the present invention, is shown. It should be appreciated that the upper (cut-in) and lower (cut-out) limits of the compressor suction pressure are programmed in the refrigeration controller 16 and that the upper and lower limits of the case temperature for each refrigeration case is programmed into the case controller 38 of each refrigeration case.

Figure 3A:
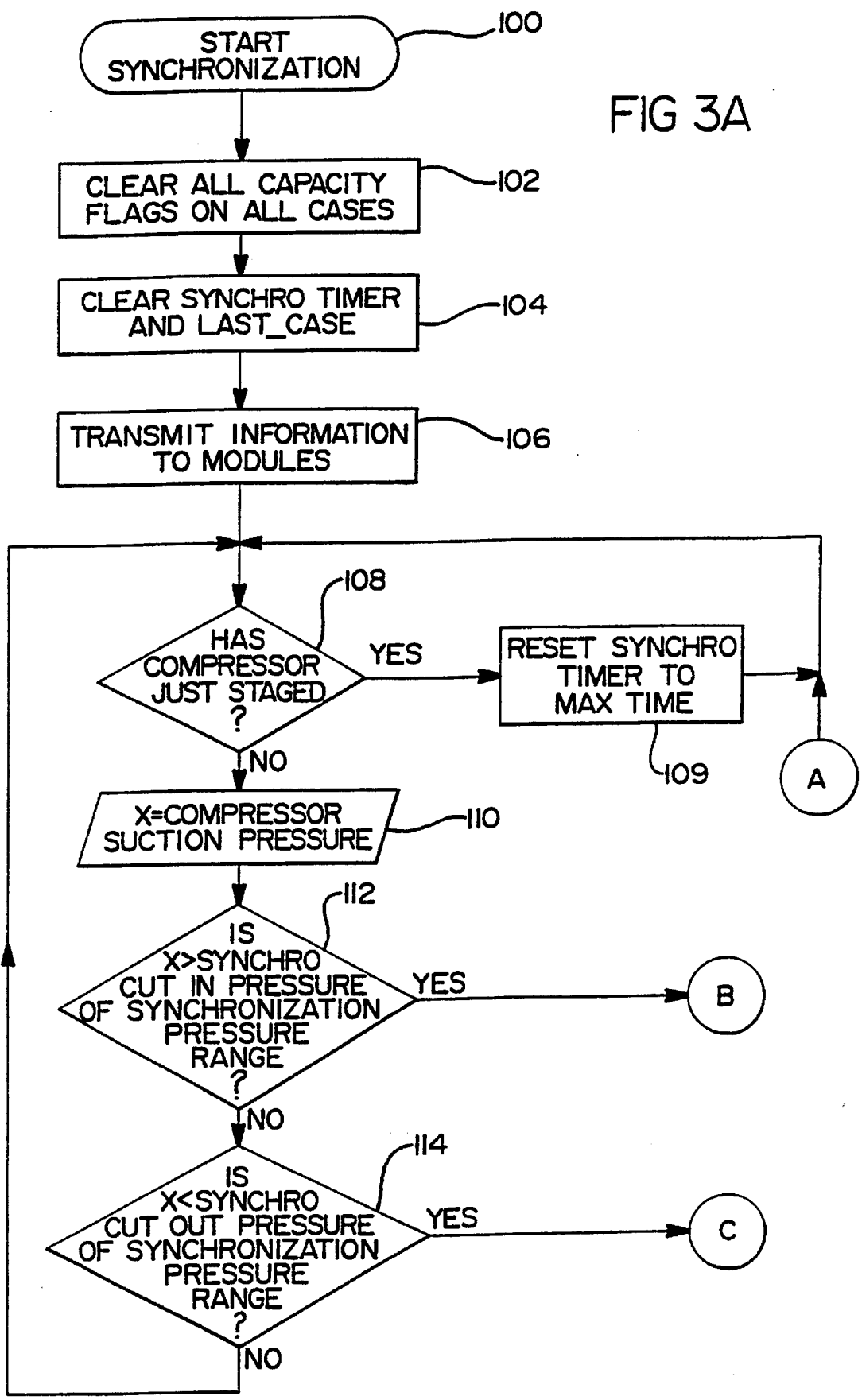
Figure 3B:
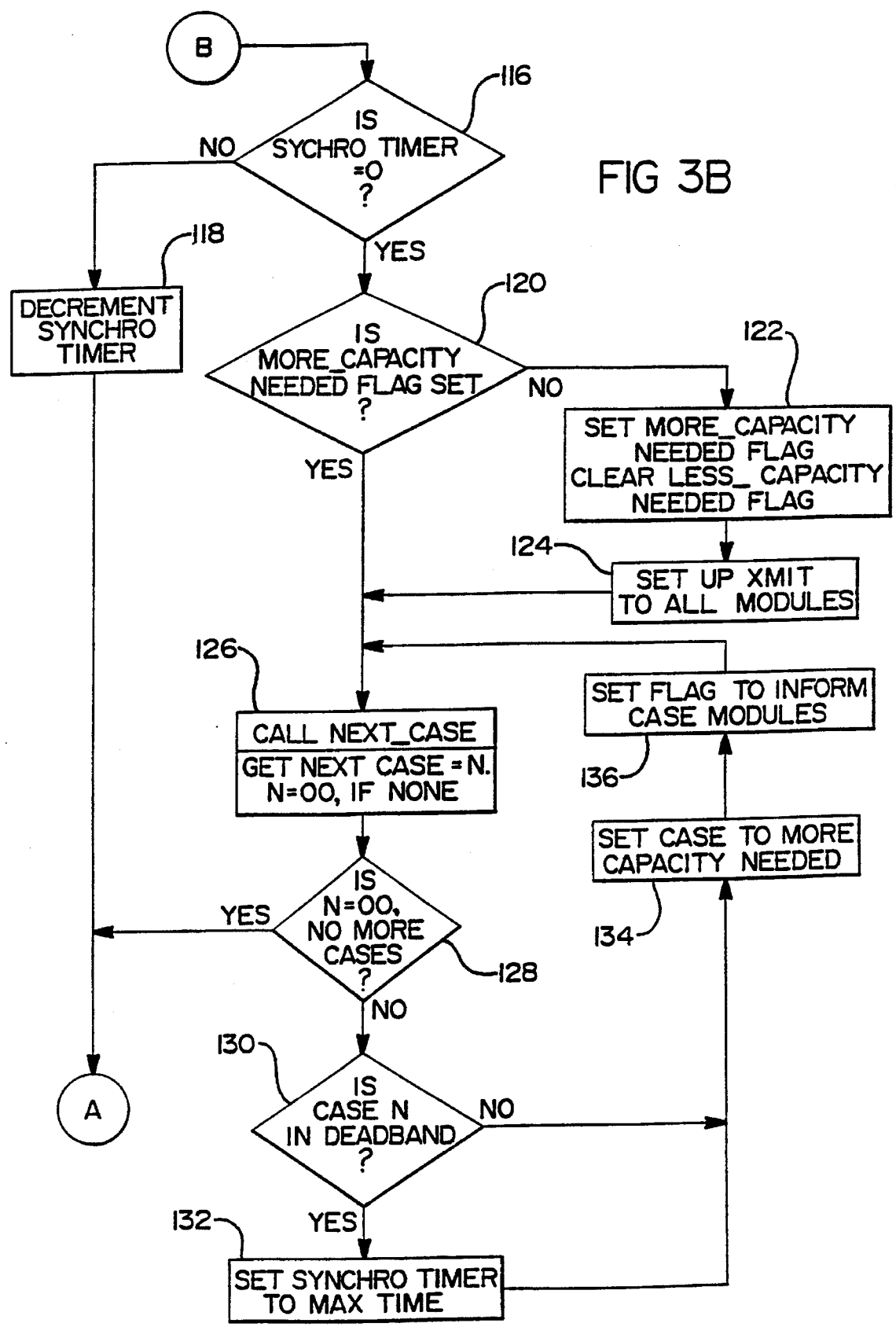

As illustrated in FIGS. 3A through 3C, the methodology starts in bubble 100 and advances to block 102. In block 102, the methodology clears all capacity flags on all refrigeration cases. The capacity flags are used to indicate that a particular refrigeration case needs more or less cooling or capacity to regulate the load on that refrigeration case.

The methodology advances from block 102 to block 104 and clears a synchronization timer or flag (not shown) of the refrigeration controller 16 and a last case flag. These flags are used to indicate that the synchronization is occurring and the number of refrigeration cases in the refrigeration system 10. The methodology then advances to block 106 and transmits the information from the refrigeration controller 16 via the communications bus 18 to the case controllers 38.

From block 106, the methodology advances to diamond 108 and determines whether a compressor from the rack of compressors 12 has just staged (e.g., turned ON or OFF), for example, by looking for a flag. If so, the methodology advances to block 109 and resets the synchronization timer to a cycle time such as two (2) minutes. The methodology then advances to diamond 108 previously described. If a compressor has not just staged, the methodology advances to block 110 and sets a predetermined variable X equal to the compressor suction pressure measured by the pressure sensor 30.

After block 110, the methodology advances to diamond 112 and determines whether the predetermined variable X is greater than a predetermined synchronization cut in pressure such as thirty-six (36) PSI stored in memory of the refrigeration controller 16. If not, the methodology advances to diamond 114 and determines whether the predetermined variable X is less than a predetermined synchronization cut out pressure such as thirty-two (32) PSI stored in memory of the refrigeration controller 16. If not, the methodology advances to the diamond 108 previously described. It should be appreciated that the predetermined synchronization cut-in pressure and predetermined synchronization cut-out pressure constitute a predetermined synchronization pressure range.

In diamond 112, if the predetermined variable X is greater than the synchronization cut in pressure, the methodology advances to diamond 116 and determines whether the time on the synchronization timer is equal to a predetermined value such as zero (0) stored in memory 16. If not, the methodology advances to block 118 and decrements the synchronization timer to the predetermined value. The methodology advances to diamond 108 previously described. If the time on the synchronization timer is equal to the predetermined value, the methodology advances to diamond 120 and determines whether a more capacity needed flag is set. If not, the methodology advances to block 122 and sets a more capacity needed flag and clears a less capacity needed flag for the refrigeration system 10. The methodology then advances to block 124 and sets up to transmit this information from the refrigeration controller 16 via the communications bus 18 to the case controllers 38.

After block 124 or if the more capacity needed flag is set in diamond 120, the methodology advances to block 126. In block 126, the methodology calls the next case subroutine to be described in conjunction with FIGS. 2D and 2E and gets the next refrigeration case which is equal to N. It should be appreciated that if N equals 0, there are no more refrigeration cases. From block 126, the methodology then advances to diamond 128 and determines whether N is equal to a predetermined value such as zero (0) (e.g., no more cases). If so, the methodology advances to diamond 108 previously described. If not, the methodology advances to diamond 130 and determines whether the refrigeration case N is in its deadband range. It should be appreciated that each refrigeration case has a pre-programmed deadband range representing a cut in temperature such as thirty-eight degrees fahrenheit (38° F.) and a cut out temperature such as thirty-four degrees fahrenheit (34° F.).

If the refrigeration case N is in its deadband range, the methodology advances to block 132 and sets the synchronization timer to the maximum time. If the refrigeration case N is not in its deadband range or after block 132, the methodology advances to block 134 and sets a more capacity needed flag for the refrigeration case N. The methodology then advances to block 136 and sets a flag to inform the case controller 38 for the refrigeration case N. The methodology then advances to block 126 previously described.

In diamond 114, if the predetermined variable X is less than the synchronization cut out pressure, the methodology advances to diamond 138 and determines whether the time on the synchronization timer is equal to a predetermined value such as zero (0). If not, the methodology advances to block 140 and decrements the synchronization timer to the predetermined value. The methodology then advances to diamond 108 previously described. If the time on the synchronization timer is equal to the predetermined value, the methodology advances to diamond 142 and determines whether a less capacity needed flag is set. If not, the methodology advances to block 144 and sets a less capacity needed flag and clears a more capacity needed flag for the refrigeration system 10. The methodology then advances to block 145 and sets up to transmit this information from the refrigeration controller 16 via the communications bus 18 to the case controllers 38.

After block 145 or if the less capacity needed flag is set in diamond 142, the methodology advances to block 146. In block 146, the methodology calls the next case subroutine to be described and gets the next refrigeration case which is equal to N. It should be appreciated that if N equals 0, there are no more refrigeration cases. From block 146, the methodology then advances to diamond 148 and determines whether N is equal to a predetermined value such as zero (0). If so, the methodology advances to diamond 108 previously described. If not, the methodology advances to diamond 150 and determines whether the refrigeration case N is in its deadband range. If so, the methodology advances to block 152 and sets the synchronization timer to the maximum time. If the refrigeration case N is not in its deadband range or after block 152, the methodology advances to block 154 and sets a more capacity needed flag for the refrigeration case N. The methodology then advances to block 156 and sets a flag to inform the case controller 38 for the refrigeration case N. The methodology then advances to block 146 previously described.

Figure 3D:
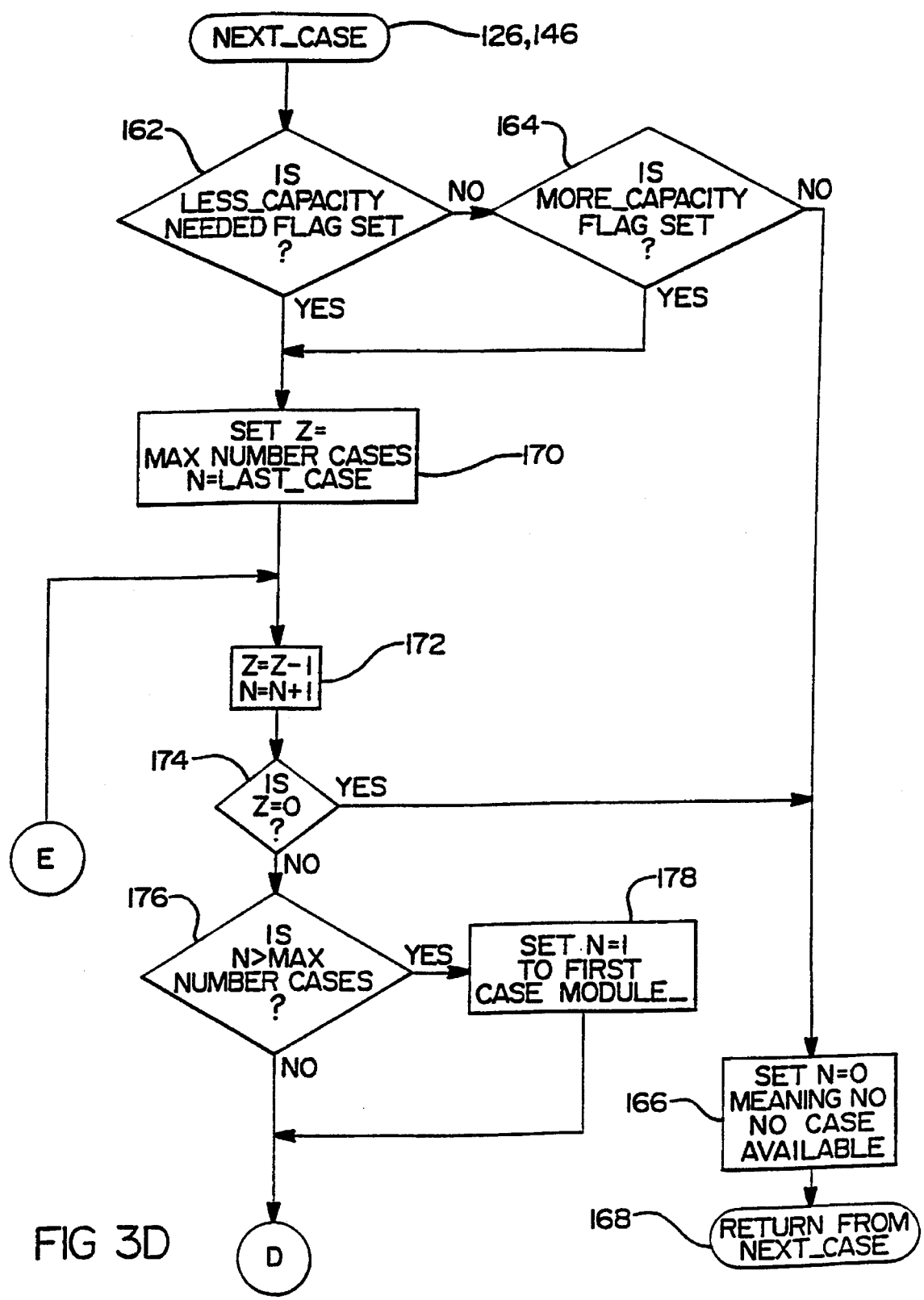
Figure 3E:
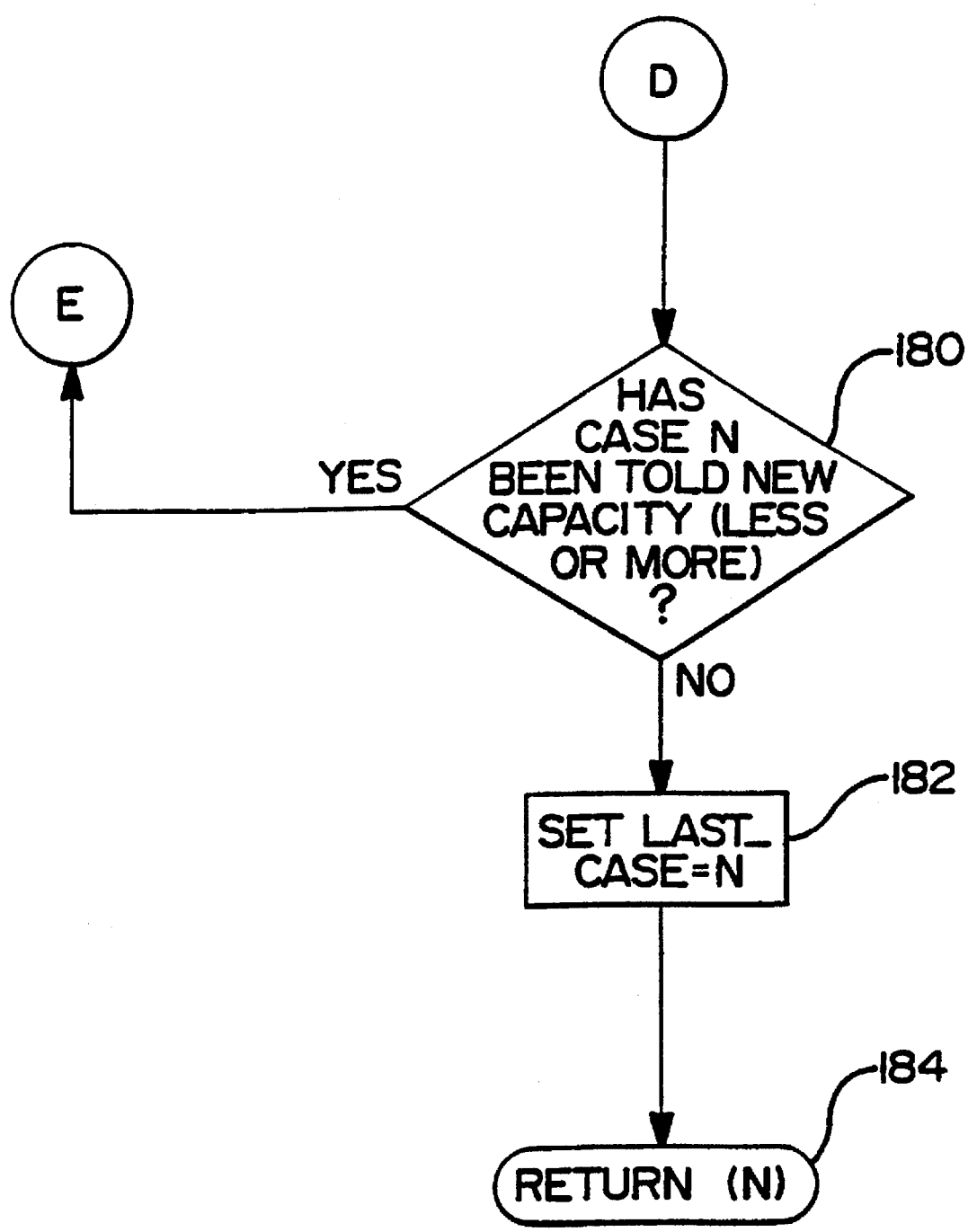

Referring to FIGS. 3D and 3E, the methodology for the next case subroutine of blocks 126 and 146 is shown. From blocks 126 and 146, the methodology advances to diamond 162 and determines whether the less capacity needed flag is set for the refrigeration system 10. If not, the methodology advances to diamond 164 and determines whether the more capacity flag needed is set for the refrigeration system 10. If the more capacity needed flag is not set, the methodology advances to block 166 and sets N equal to a predetermined value such as zero (0), meaning no refrigeration case is available. The methodology then advances to bubble 168 and returns.

In diamond 162 if the less capacity needed flag is set, or in diamond 164 if the more capacity needed flag is set, the methodology advances to block 170 and sets a predetermined variable Z equal to the maximum number of cases and the predetermined variable N equal to the last case. The methodology then advances to block 172 and sets the predetermined variable Z equal to Z minus 1 and the predetermined variable N equal to N plus 1. The methodology then advances to diamond 174 and determines whether the predetermined variable Z is equal to a predetermined value such as zero (0). If so, the methodology advances to block 166 previously described. If not, the methodology advances to diamond 176 and determines whether the predetermined variable N is greater than the maximum number of cases (predetermined variable Z). If so, the methodology advances to block 178 and sets the predetermined variable N equal to a predetermined value such as one (1) to indicate the first case controller 38.

In diamond 176 if the predetermined variable N is not greater than the maximum number of cases, or after block 178, the methodology advances to diamond 180 and determines whether the case controller 38 for the refrigeration case N has been told its new capacity (e.g., less or more needed), for example, by looking for a flag. If so, the methodology advances to block 172 previously described. If not, the methodology advances to block 182 and sets the last refrigeration case equal to the predetermined variable N. The methodology then advances to block 184 and returns to blocks 128 or 148.

An example of the operation of the methodology for the refrigeration system 10 is as follows:

In the refrigeration system 10, a rack of four compressors 12 may have a cut out (turn off) pressure of 32 PSI and a cut in (turn on) pressure of 40 PSI of compressor suction pressure. Six individual refrigeration cases (not shown) of the refrigeration system 10 may have cut out and cut in temperature values of the following:

| cases | cut in (T) | cut out (T) |
|---|---|---|
| case 1 | 38 | 34 |
| case 2 | 32 | 28 |
| case 3 | 39 | 35 |
| case 4 | 37 | 33 |
| case 5 | 20 | 16 |
| case 6 | 22 | 18 |

During normal operation, i.e. predetermined full pressure range or deadband control, the methodology simply turns ON another rack compressor 12 via the refrigeration controller 16 if the compressor suction pressure goes above the cut in pressure of 40 PSI. The methodology waits or delays a predetermined time interval, and if the compressor suction pressure is still above 40 PSI, the methodology turns ON another rack compressor 12. This staging continues until either all rack compressors 12 are ON, or the compressor suction pressure drops below the cut out pressure of 32 PSI. Similarly, when the compressor suction pressure goes below the cut out pressure of 32 PSI, and the predetermined time interval has timed out, the methodology turns OFF another rack compressor 12 until all rack compressors 12 have staged down or been turned OFF. Without synchronization in the methodology, the case controllers 38 would similarly turn ON and OFF at only the predetermined temperatures of each case. The case 1 controller 38 turns ON if the temperature of its refrigeration case gets above its cut in temperature of thirty-eight (38) degrees and stays ON until the temperature of that refrigeration case goes below its cut out temperature of thirty-four (34) degrees. It should be appreciated that the temperature area between thirty-eight (38) and thirty-four (34) degrees is the deadband area or range.

When using the predetermined full pressure range or predetermined full pressure control described in the above example, with synchronization, the methodology determines that the refrigeration system 10 needs more capacity when the compressor suction pressure goes above the predetermined synchronization cut-in pressure which is a predetermined value such as thirty-six (36) PSI; that is, the predetermined value may be the fifty percent (50%) point of the deadband range of eight (8) PSI (40–32 PSI) for the compressor suction pressure. The methodology causes the refrigeration controller 16 to scan the information from the case controllers 38 to find a refrigeration case controller 38 that has its output ON (e.g., requires more cooling), but is within its temperature deadband range. The methodology causes the refrigeration controller 16 to inform that case controller to shut OFF its load via its expansion valve 40, thus increasing the available capacity to the rack of compressors 12. If after one sixth of the staging time for the rack of compressors 12, the compressor suction pressure is still not below thirty-six (36) PSI, the methodology informs another case controller 38 that is in its temperature deadband range and has its output ON via its case controller 38, to terminate its load via its expansion valve 40 earlier than its normal cut out temperature. The methodology rotates through its refrigeration cases informing all the case controllers 38 in rotation of the need for more capacity while delaying only after terminating a refrigeration case load early. This continues until all refrigeration cases have been informed or until the compressor suction pressure goes below thirty-six (36) PSI. If the reduction in load of the refrigeration cases is not sufficient to go below thirty-six (36) PSI, and the compressor suction pressure gets above forty (40) PSI, the methodology will turn ON another rack compressor 12 via the refrigeration controller 16. If the synchronization is successful such that the compressor suction pressure goes to thirty-six (36) PSI, the methodology informs all the case controllers via the refrigeration controller 16 that no more capacity is needed and goes back to full pressure range or deadband control (e.g., without synchronization). Similarly if the compressor suction pressure gets below thirty-six (36) PSI, the methodology informs the case controllers 38 of the need for less capacity and turns ON the case controllers 38 that are within their deadband areas but presently not already ON. It should be appreciated that the methodology maintains or stores the first case controller 38 that went into capacity shed and the first case controller 38 that went into capacity storage so that it can rotate to another load to start the synchronization process at different case controllers 38 on the next need in that direction.

The affect on the case controller 38 would be a modification of its deadband area to affect the capacity of the refrigeration controller 16. When told by the refrigeration controller 16 that more capacity is needed by the rack of compressors 12, the case 1 controller 38 would disregard the cut out temperature and control to a single cut in setpoint. When told by the refrigeration controller 16 that the condition is gone, the case 1 controller 38 would go back to full hysterisis deadband control. When told by the refrigeration controller 16 that less capacity is needed by the rack of compressors 12, the case 1 controller 38 would disregard the cut in temperature and control to a single cut out setpoint. This will increase on/off cycling on the expansion valves 40 to reduce cycling of the rack of compressors 35.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of controlling a plurality of commonly piped compressors for a refrigeration system having a plurality of refrigeration cases, said method comprising the steps of:

sensing a suction pressure of the refrigeration system;

determining whether the sensed suction pressure is within a predetermined full pressure range;

turning compressors ON or OFF until the suction pressure is within the predetermined full pressure range when the sensed suction pressure is not within the predetermined full pressure range;

delaying a predetermined time interval after turning a compressor ON or OFF;

repeating said steps of sensing and determining;

determining whether the sensed suction pressure is within a predetermined synchronization pressure range;

turning another compressor ON or OFF when the sensed suction pressure is not within the predetermined full pressure range;

sensing a case temperature for each of the refrigeration cases when the sensed suction pressure is within the predetermined synchronization pressure range;

determining whether the sensed case temperature is within a predetermined temperature range; and turning the expansion valve ON or OFF of the refrigeration cases found when the case temperature is within the predetermined temperature range until the sensed case temperature is not within the predetermined synchronized pressure range.

2. A method of controlling a plurality of commonly piped compressors for a refrigeration system having a plurality of refrigeration cases, said method comprising the steps of:

sensing a suction pressure of the refrigeration system;

determining whether the sensed suction pressure is within a predetermined full pressure range;

turning compressors ON or OFF in stages until the suction pressure is within the predetermined full pressure range when the sensed suction pressure is not within the predetermined full pressure range;

sensing a case temperature for each of the refrigeration cases when the sensed suction pressure is within a predetermined synchronization pressure range;

determining whether the sensed case temperature is within a predetermined temperature range; and turning selectively the load on each of the refrigeration cases ON or OFF when the case temperature is within the predetermined temperature range until the sensed suction pressure is within the predetermined synchronization pressure range.

3. A method as set forth in claim 2 including the step of delaying a predetermined time interval after turning a compressor ON or OFF.

4. A method as set forth in claim 3 including repeating said step of sensing the suction pressure and said step of determining whether the sensed suction pressure is within the predetermined full pressure range after said step of delaying.

5. A method as set forth in claim 4 including the step of turning another compressor ON or OFF when the sensed suction pressure is not within the predetermined full pressure range.

6. A method as set forth in claim 2 including the step of scanning each refrigeration case to find a refrigeration case that has its output ON but has its sensed temperature within its predetermined temperature range.

7. A method as set forth in claim 6 including the step of turning OFF the refrigeration case that is found.

8. A method as set forth in claim 7 including the step of determining whether the sensed suction pressure is at an end of the predetermined synchronization pressure range.

9. A method as set forth in claim 8 including repeating said steps of scanning and turning when the sensed suction pressure is not at the end of the predetermined synchronization pressure range.

10. A method as set forth in claim 9 including the step of rotating through the refrigeration cases.

11. A method as set forth in claim 9 including the step of storing the number of the refrigeration case that is turned OFF.

12. A method as set forth in claim 11 including the step of turning OFF a refrigeration case different from the stored number upon repeating said method.

13. A method as set forth in claim 2 including the step of scanning each refrigeration case to find a refrigeration case that has its output OFF but has its sensed temperature within its predetermined temperature range.

14. A method as set forth in claim 13 including the step of turning ON the refrigeration case that is found.

15. A method as set forth in claim 14 including the step of determining whether the sensed suction pressure is at an end of the predetermined synchronization pressure range.

16. A method as set forth in claim 15 including repeating said steps of scanning and turning when the sensed suction pressure is not at the end of the predetermined synchronization pressure range.

17. A method as set forth in claim 16 including the step of rotating through the refrigeration cases.

18. A method as set forth in claim 17 including the step of storing the number of the refrigeration case that is turned ON.

19. A method as set forth in claim 18 including the step of turning ON a refrigeration case different from the stored number upon repeating said method.

20. A method of controlling a plurality of commonly piped compressors for a refrigeration system having a plurality of refrigeration cases, said method comprising the steps of:

sensing a suction pressure of the refrigeration system;

determining whether the sensed suction pressure is within a predetermined full pressure range;

turning compressors ON or OFF until the suction pressure is within the predetermined full pressure range when the sensed suction pressure is not within the predetermined full pressure range;

delaying a predetermined time interval after turning a compressor ON or OFF;

sensing the suction pressure;

determining whether the sensed suction pressure is within a predetermined synchronization pressure range;

turning another compressor ON or OFF when the sensed suction pressure is not within the predetermined full pressure range;

sensing a case temperature for each of the refrigeration cases when the sensed suction pressure is within the predetermined synchronization pressure range;

determining whether the sensed case temperature is within a predetermined temperature range; and turning selectively the expansion valve on each of the refrigeration cases ON or OFF when the case temperature is within the predetermined temperature range until the sensed suction pressure is not within the predetermined synchronized pressure range.

21. A method as set forth in claim 20 including the step of scanning each refrigeration case to find a refrigeration case that has its output ON but has its sensed temperature within its predetermined temperature range.

22. A method as set forth in claim 21 including the step of turning the expansion valve OFF on the refrigeration case that is found.

23. A method as set forth in claim 22 including the step of determining whether the sensed suction pressure is at an end of the predetermined synchronized pressure range.

24. A method as set forth in claim 23 including repeating said steps of scanning and turning if the sensed suction pressure is not at the end of the predetermined synchronization pressure range.

25. A method as set forth in claim 24 including the step of storing the number of the refrigeration case that is turned OFF and turning OFF a refrigeration case different from the stored number upon repeating said method.

26. A method as set forth in claim 20 including the step of scanning each refrigeration case to find a refrigeration case that has its output OFF but has its sensed temperature within its predetermined temperature range.

27. A method as set forth in claim 26 including the step of turning the expansion valve ON on the refrigeration case that is found.

28. A method as set forth in claim 27 including the step of determining whether the sensed suction pressure is at an end of the predetermined synchronization pressure range.

29. A method as set forth in claim 28 including repeating said steps of scanning and turning if the sensed suction pressure is not at the end of the predetermined synchronization pressure range.

30. A method as set forth in claim 29 including the step of storing the number of the refrigeration case that is turned ON and turning ON a refrigeration case different from the stored number upon repeating said method.

* * * * *

UNITED STATES PATENT AND TRADEMARK OFFICE
CERTIFICATE OF CORRECTION

PATENT NO. : 5,460,008
DATED : October 24, 1995
INVENTOR(S) : James H. Ott et al.

It is certified that error appears in the above-indentified patent and that said Letters Patent is hereby corrected as shown below:

Column 5, line 9, after "F", please delete ".".

Column 5, line 10, after "F", please delete ".".

Column 7, line 9, delete "predetermined full pressure" and insert therefor --deadband--.

Column 7, line 16, delete "deadband" and insert therefor --predetermined full pressure--.

Column 7, line 16, after "(40-32 PSI)", please insert --,--.

Column 8, line 41, please delete "case temperature" and insert therefor --suction pressure--.

Column 8, line 41, please delete --not--.

Column 10, line 19, please delete --not--.

Signed and Sealed this

Fourth Day of June, 1996

Attest:

BRUCE LEHMAN

*Attesting Officer*        *Commissioner of Patents and Trademarks*